(12) United States Patent
Bourgon et al.

(10) Patent No.: US 6,443,390 B2
(45) Date of Patent: Sep. 3, 2002

(54) DEVICE FOR PRESSURE TAPPING AND PROCEDURE FOR SETTING IT ON A FUSELAGE PANEL OF AN AIRCRAFT

(75) Inventors: Jean-Marc Bourgon, Amancey; Serge Bayonne, Cadours; Bruno Chauveau, Toulouse, all of (FR)

(73) Assignee: Eads Airbus SA, Paris (FR)

( * ) Notice: Subject to any disclaimer, the term of this patent is extended or adjusted under 35 U.S.C. 154(b) by 0 days.

(21) Appl. No.: 09/811,426

(22) Filed: Mar. 20, 2001

(30) Foreign Application Priority Data

Apr. 14, 2000 (FR) .............................................. 00 04831

(51) Int. Cl.$^7$ ................................................ B64C 1/00
(52) U.S. Cl. ........................................ 244/1 R; 73/182
(58) Field of Search ................................. 244/1 R, 207, 244/208, 209, 130; 73/182, 384

(56) References Cited

U.S. PATENT DOCUMENTS 5,540,406 A * 7/1996 Occhipinti .................. 244/200
5,588,616 A * 12/1996 Perkins ........................ 244/1 R
5,616,861 A    4/1997 Hagen
5,657,946 A *  8/1997 Perkins ........................ 244/1 R
6,042,057 A *  3/2000 Rice ........................ 244/158 R

FOREIGN PATENT DOCUMENTS

GB          2 274 170 A     7/1994

* cited by examiner

Primary Examiner—Peter M. Poon
Assistant Examiner—Timothy D. Collins
(74) Attorney, Agent, or Firm—Robert E. Krebs; Thelen Reid Priest

(57) ABSTRACT

Device for pressure tapping, integrated into the fuselage of an aircraft, comprising an integrated plate (10), without discontinuity, with a pressure tapping part in the center (16). The plate (10) enters a supplementary opening (22) formed in a fuselage panel (20). The plate (10) and the panel part (20) surrounding the opening (22) are fixed on a supporting element (18) linked to the framework of the aircraft (34, 36). In the case where rivet, screw or bolt type fixations are used, they are placed at the edge of the plate (10). This arrangement facilitates assembly and improves the precision of the measurement, by suppressing any discontinuity in the measurement zone.

9 Claims, 4 Drawing Sheets

DEVICE FOR PRESSURE TAPPING AND PROCEDURE FOR SETTING IT ON A FUSELAGE PANEL OF AN AIRCRAFT

TECHNICAL FIELD

The present invention relates to a device for pressure tapping intended to be implanted on the fuselage of an aircraft.

The invention also concerns a procedure for setting such a device for pressure tapping on a fuselage panel of an aircraft.

STATE OF PRIOR ART

Aircraft and in particular aeroplanes are equipped with different probes designed to measure a certain number of parameters. These parameters are then transmitted to the equipment, in such a way as to ensure correct operation of the aircraft and its instruments. Thus, certain probes, located near the combustion chamber, supply information making it possible to follow the behavior of the engine (temperature of gas ejection, rev/min, etc.). Other probes, installed under the fuselage, deliver information about the environment outside the aircraft (temperature, pressure, etc.).

Among the probes installed under the fuselage of the aircraft, one finds probes for measuring static pressure. The information delivered by these probes makes it possible to calculate the altitude of the aircraft.

For example, as shown schematically in FIG. 1, which represents the nose of an aeroplane in perspective, one S of the pressure intakes, intended to make it possible to measure the static pressure, is located in the front part of the fuselage, on the side. This type of probe is generally located on the fuselage, in an aerodynamic flow zone which is little disturbed.

As shown in more detail in FIG. 2 of the attached drawings, the pressure tapping device S comprises a part for pressure tapping 2 which comes in the form of a disk pierced with holes, generally called a "pepper-pot". Usually, the pressure tapping device S is carried by a support element 3, which is fixed on the framework 4 forming the structure of the aeroplane. The framework 4 is then covered by a fuselage panel 5, and this panel 5 is fixed on the framework 4 and on the support element 3, generally by means of rivets whose passage holes appear as 6 on FIG. 2. The pressure tapping part 2 is then received in a circular opening 7 formed in the panel of the fuselage 5.

Generally speaking, the quality and precision of the pressure measurement carried out by a probe (not shown) connected to the pressure tapping device S are lessened as soon as the aerodynamic air flow along the fuselage of the aircraft is disturbed in the region of the pressure tapping part 2. For this reason, it is essential that the pressure tapping part 2 of the device S is very precisely flush with the external surface of the fuselage panel 5 in which this device is integrated. In the conventional arrangement illustrated in FIG. 2, this result requires a levelling operation of the pressure tapping part 2, until the external surfaces of said pressure tapping part and the fuselage panel are perfectly aligned.

This conventional technique poses a certain number of problems.

First of all, the machining of a small circular opening 7 in the fuselage panel 5 causes deformation and thus significant stresses in this panel. The high number and setting of the rivets used to fix the panel 5 on the support element 3 accentuate this deformation. In addition, the heads of the rivets located in the immediate proximity of the pressure tapping part 2 of the device S contribute to local disturbance of the aerodynamic flow. This results in measurement errors and thus a loss of precision of the probe.

Moreover, the levelling operation carried out after mounting the device S is an industrially complicated operation. In fact, since the tolerances are very low, this operation requires great precision and therefore a lot of time. If it is carried out poorly, the probe will deliver inexact measurements, which is not acceptable as mentioned above.

Another inconvenience of the technique for setting the device S used at present appears when it is damaged in the event of a shock. In this case the pressure tapping part 2 has to be replaced and the levelling operation repeated. Replacement is thus lengthy and difficult.

In the hypothesis where the fuselage panel is slightly damaged close to the device S, it is not worth replacing it. Nonetheless, a simple scratch on the panel modifies the local aerodynamic flow and falsifies the measurement. Extremely precise polishing is then carried out. Again, this is an industrially complicated operation and is delicate to manage.

Finally, it is to be noted that the evolution of the standards regulating air traffic tend to diminish the gap in altitude between the corridors used by aeroplanes, in order to raise the density of traffic. Increasingly precise measurement of the altitude of the aeroplane is thus indispensable. The result is a demand for a very low overall margin of error as far as pressure measurements are concerned, carried out by the static pressure probes with which aircraft are equipped. This evolution makes the utilisation of existing pressure measurement devices more and more delicate.

DESCRIPTION OF THE INVENTION

The aim of the present invention is a device for tapping pressure for an aircraft, with an original design which significantly improves the quality of the measurements made by the probe, at the same time making it quicker and simpler to be set on the fuselage panel, and to be changed if needed.

According to the invention, this result is obtained by means of a device for an aircraft for pressure tapping, comprising at least one support element, a part for pressure tapping carried by the support element and turned towards the outside of the aircraft, and a fuselage panel fixed on the support element and provided with an opening which receives the part for pressure tapping, a device characterised in that it also comprises a plate in which is integrated, without discontinuity, the part for pressure tapping, said plate being fixed on the support element and the opening having a shape and dimensions almost identical to those of the plate, in such a way that the latter is received in said opening and is flush with the external surface of the fuselage panel.

Since the part for pressure tapping is integrated, without discontinuity, into a plate of relatively large dimensions, the continuity of the aerodynamic profile of the fuselage is ensured in the measurement zone surrounding the part for pressure tapping, without any machining being necessary. In addition, it becomes possible to fix this plate on the support element from the outside of the aircraft, in an opening in the fuselage panel, whose shape and dimensions are adapted to those of the plate. This method of fixation makes it possible to adjust the plate easily in such a way that its external surface is flush with the external surface of the fuselage panel without any levelling operation being required. In fact, the flush tolerance is much less strict at the edge of the plate than in the measurement zone. Thus, a much simpler and much faster mounting can be made. In addition, the replacement of a pressure tapping part which may be damaged following a shock is also simpler and faster.

Moreover, since this technique makes it possible to guarantee the continuity of the external surface of the aircraft fuselage in the measurement zone located close to the pressure tapping part, the quality and precision of the measurement are naturally improved.

Besides this, slight damage to the plate integrating the pressure tapping part, such as a scratch, can be remedied by simply replacing this plate. If the damage is to the fuselage panel, the defect is sufficiently far away from the pressure tapping part so as not to cause any disturbance in the measurement.

Advantageously, in order to be able to adjust the plate relative to the fuselage panel, during fixation of said plate on the support element, shims are used. This makes it possible, without difficulty, to ensure with precision that the external surfaces of the plate and the fuselage panel are flush.

The support element is recessed relative to the opening formed in the fuselage panel, and the plate is countersunk in this recess. Advantageously, in order to facilitate setting the plate in place, the recess has a plane base, against which a plane face of said plate is applied.

In a preferred embodiment of the invention, the pressure tapping part is constituted by a central region of the plate, pierced by perforations.

Advantageously, the plate is then fixed onto the support element by fixation elements, such as screws or bolts, which are all arranged around the edge of the plate. The fixation elements are thus at a distance from the measurement zone located near the pressure tapping part. This contributes to guaranteeing the quality and precision of the measurement made by the probe.

Preferably, and for the same reason, the fixation elements are arranged outside an angular air flow zone centered on said pressure tapping part. Advantageously, this angular air flow zone without fixation elements forms an angle of at least about 30° which coincides with the surface of the plate along which the air flows towards the part for taking pressure.

The invention also concerns a procedure for installing a pressure tapping device on a fuselage panel of an aircraft, according to which the fuselage panel is fixed on a support element, in such a way that a pressure tapping part is received in an opening formed in said panel, the procedure being characterised in that, without discontinuity, the pressure tapping part is integrated with a plate of shape and dimensions almost identical to those of said opening and in that said plate is fixed on the support element after having fixed the fuselage panel on the support element, in such a way that the plate is received in said opening and is flush with the external surface of the fuselage.

BRIEF DESCRIPTION OF THE DRAWINGS

Below is described, as a non-limiting example, a preferred mode of embodiment of the invention, with reference to the attached drawings, in which.

DETAILED DESCRIPTION OF A PREFERRED EMBODIMENT OF THE INVENTION

Figure 1:
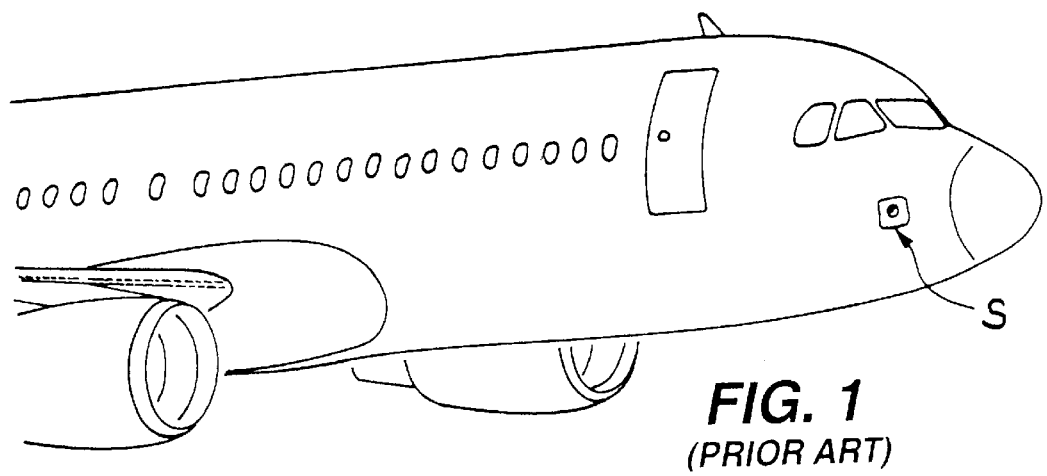
FIG. 1, described above, is a view in perspective representing very schematically the front part of the fuselage of an aircraft.
Figure 2:
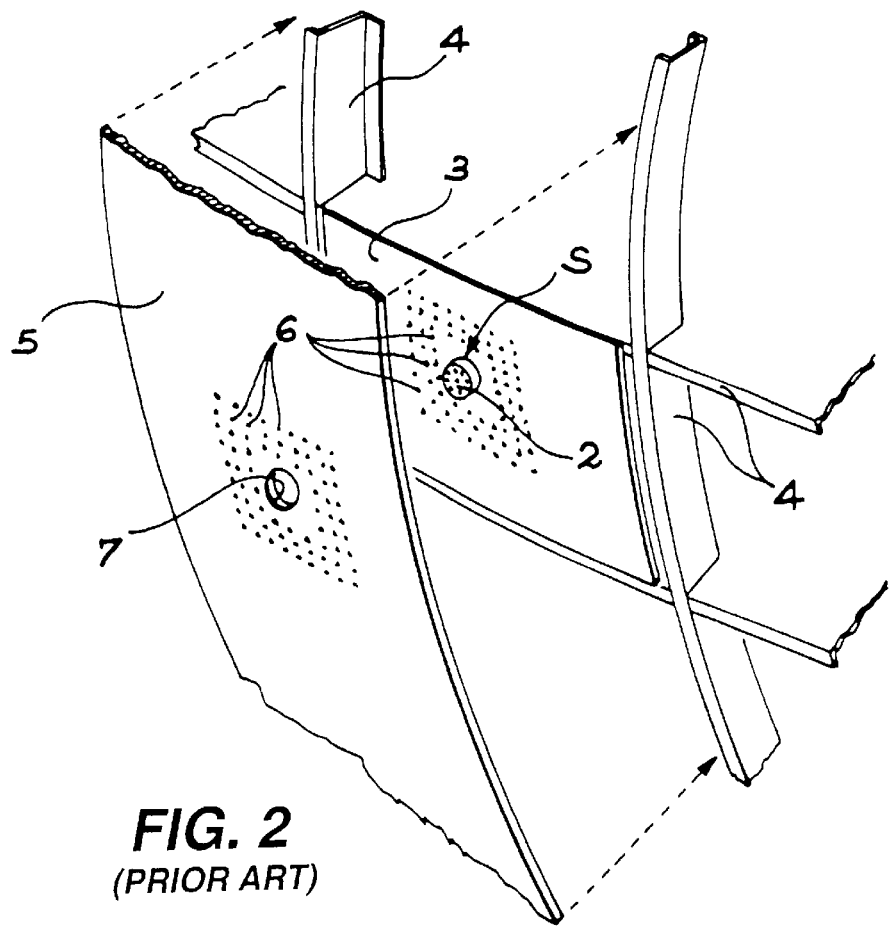
FIG. 2, described above, is an exploded view in perspective illustrating schematically the installation of a pressure tapping device on a front fuselage panel of the aircraft of FIG. 1, according to prior art.
Figure 3:
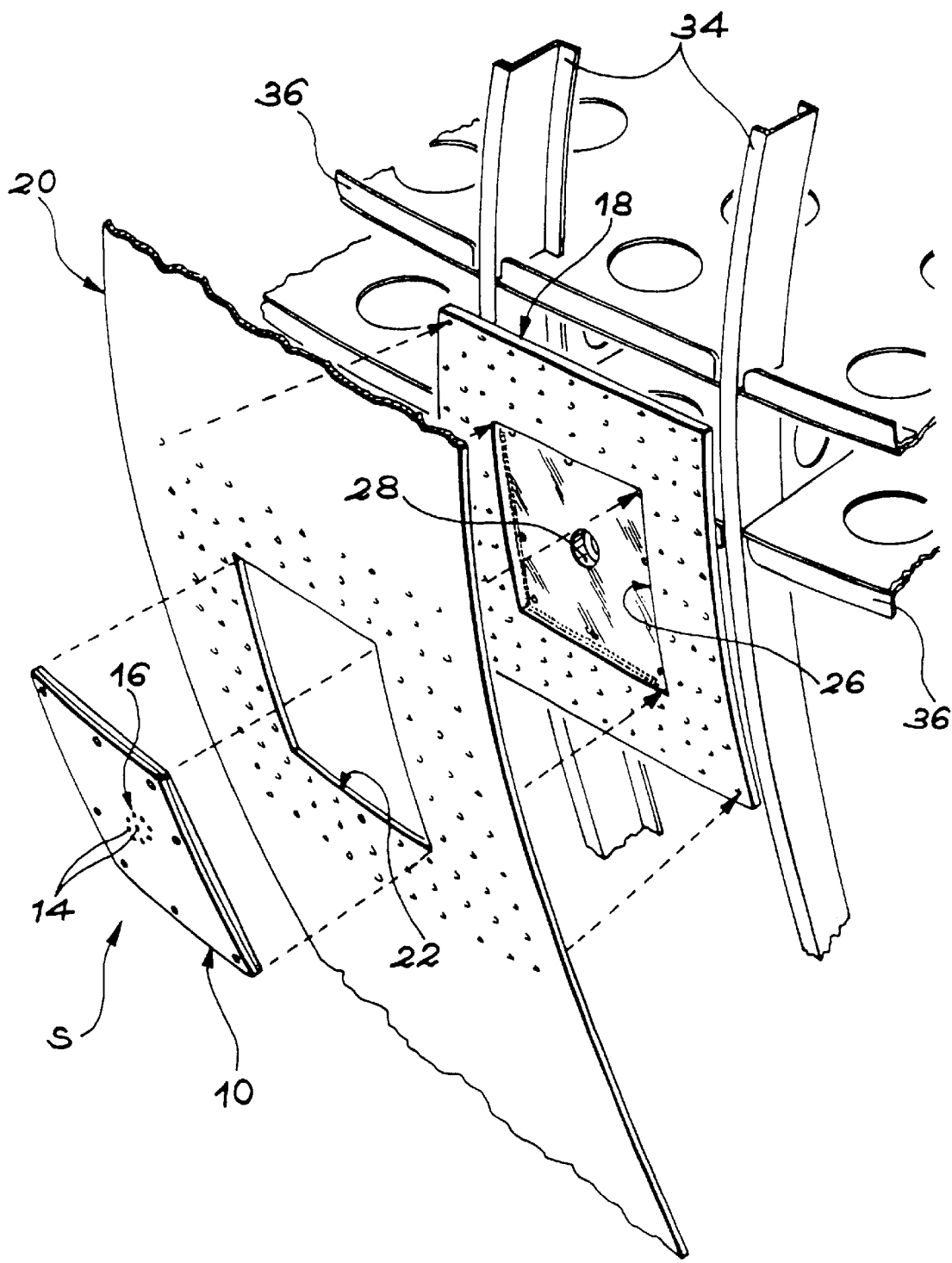
FIG. 3 is a view in perspective illustrating schematically the installation of a pressure tapping device on a fuselage panel of an aircraft, in conformity with the invention.

As shown in schematic form in FIG. 3, the pressure tapping device according to the invention comprises a plate 10 whose external surface is intended to form a small part of the external surface of the aircraft fuselage. A central region of the plate 10, pierced by perforations 14, constitutes the pressure tapping part 16 of a measurement probe of static pressure (not shown). The plate 10 and the pressure tapping part 16 of the probe thus form a sub-assembly whose installation on the aircraft fuselage will be described below. It is to be noted that the pressure tapping part 16 of the probe is integrated on the plate 10 in such a way that the external surface of the latter has no discontinuity other than the perforations 14.

The device for measuring pressure in conformity with the invention also comprises a support element 18, intended to be fixed to the structure of the aircraft, in a manner which will be described below as an example.

Figure 4:
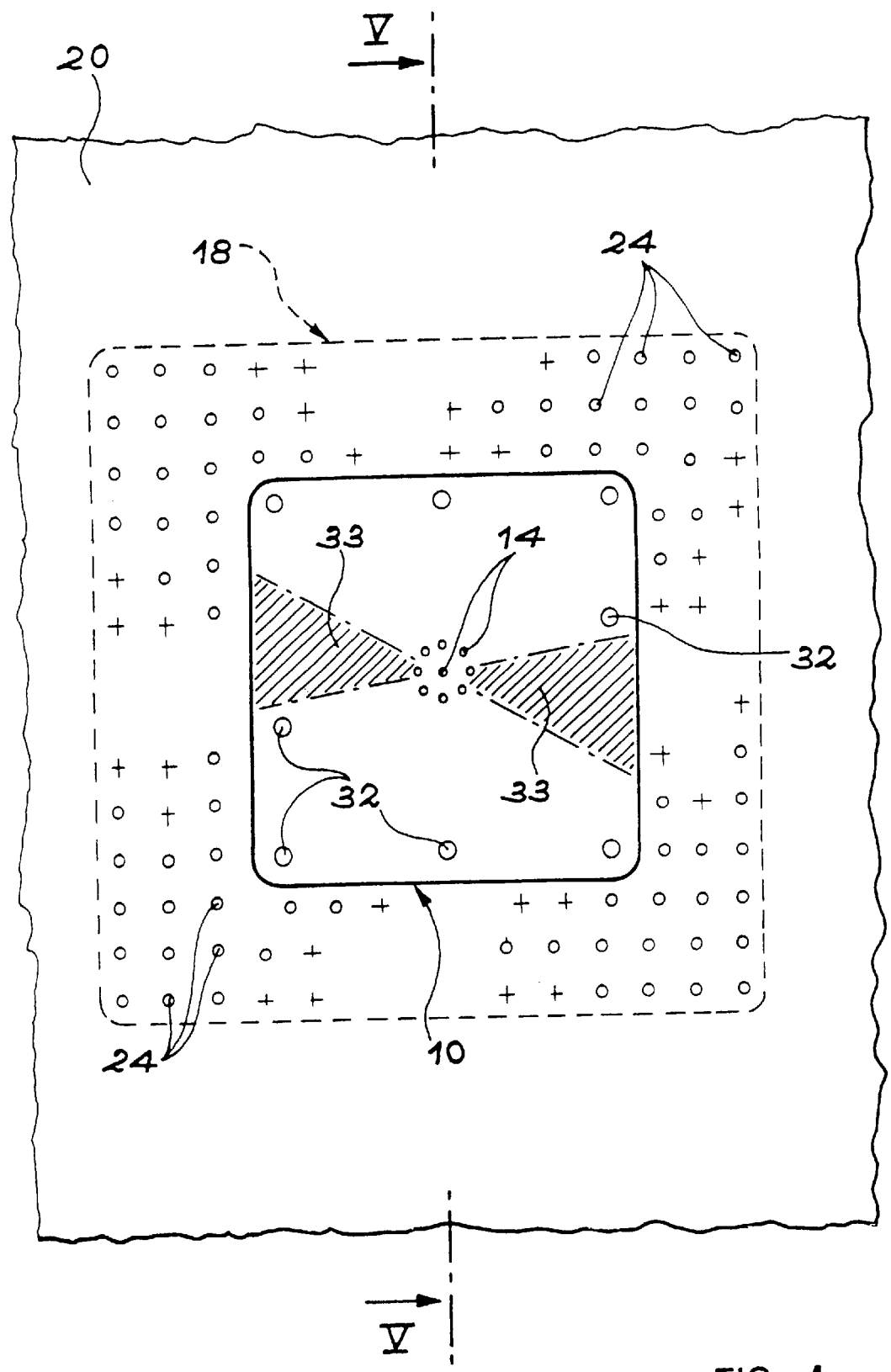
FIG. 4 is a front view of a pressure tapping device in conformity with the invention.

Finally, the device for measuring pressure according to the invention comprises a fuselage panel 20, also intended to be fixed to the aircraft structure. This fuselage panel 20 comprises an opening or window 22, located integrally facing the support element 18. More precisely, the shape and dimensions of the opening 22 are almost identical to those of the plate 10 (taking into account the assembly play) and the parts of the panel 20 surrounding this opening 22 rest on the support element 18, in order to be fixed to it by fixation elements 24 such as rivets, screws or bolts, as shown in FIG. 4. Fixation of the panel 20 by gluing can also be envisaged, without going beyond the framework of the invention.

The sub-assembly constituted by the plate 10 and the pressure tapping part 16 is installed on the fuselage panel 20 from the outside of the aeroplane, after the panel 20 itself has been mounted and fixed on the support element 18 by the fixation elements 24. More precisely, plate 10 is lodged in the opening 22 as well as in a recess 26 formed in front of the opening 22 on the face of the support element 18 turned towards the outside. Advantageously, the base of the recess is plane, as is the rear face of the plate 10, which rests against said base.

A hole 28 is formed in the center of the support element 18, at the base of the recess 26 and facing the pressure tapping part 16. A flexible hose 27 is connected to this hole 28, behind the support element 18, to link the pressure tapping part 16 to the probe (not shown). A de-icing device 29 surrounds the flexible hose 27, behind the support element 18.

Advantageously, when the assembly formed by the plate 10 and the pressure tapping part 16, are put in place, shims 30 (FIG. 5) are interposed between the plate 10 and the support element 18, in the base of the recess 26, so that the external surface of the plate 10 is precisely flush, and without discontinuity with the external surface of the fuselage panel 20. The shims 30 can in particular be strippable shims of 0.05 mm per sheet. The arrangement obtained is such that the external surfaces of the plate 10 and the panel 20 are perfectly aligned over the whole of the periphery of the plate. However, it is to be noted that the distance separating the peripheral edge of the plate 10 from the pressure tapping part 16 is sufficient so that the effect of a possible slight fault in alignment has practically no influence on the precision of the measurement. This is why levelling is not necessary.

The plate 10 is generally fixed on the support element 18 by fixation elements 32 such as screws or bolts. As shown in particular in FIG. 4, these fixation elements 32 are all arranged around the periphery of the plate 10, that is to say at a setting as far away as possible from the perforations 14 forming the pressure tapping part 16 of the probe.

Besides, as also shown in FIG. 4, the fixation elements 32 are placed outside an angular zone of air flow 33 centered on the pressure tapping part 16 of the probe. This angular zone 33 is shown by lines of dots and dashes on FIG. 4. Advantageously it forms an angle of at least about 30°. The angular zone 33 without fixation elements 32 is centered on a line passing through the center of the pressure tapping part 16 and inclined upwards from front to back.

In a variant of an embodiment not shown, the fixation elements 32 are suppressed and the plate 10 is glued to the support element 18. The characteristics as a whole which have been described above make it possible to ensure that the air flowing across the perforation 14 ensuring the pressure tapping of the probe undergoes practically no disturbance along its aerodynamic flow close to the pressure tapping part. Consequently, quality and precision of measurement significantly higher than those obtained using existing measuring devices are ensured.

In addition it is to be noted that these characteristics are obtained without the need for recourse to levelling operations which are lengthy and complicated in application.

It is also to be noted that the arrangement which has just been described above makes it possible, if necessary, to replace the pressure tapping part and the support plate quickly and simply, from the outside of the aircraft.

Figure 5:
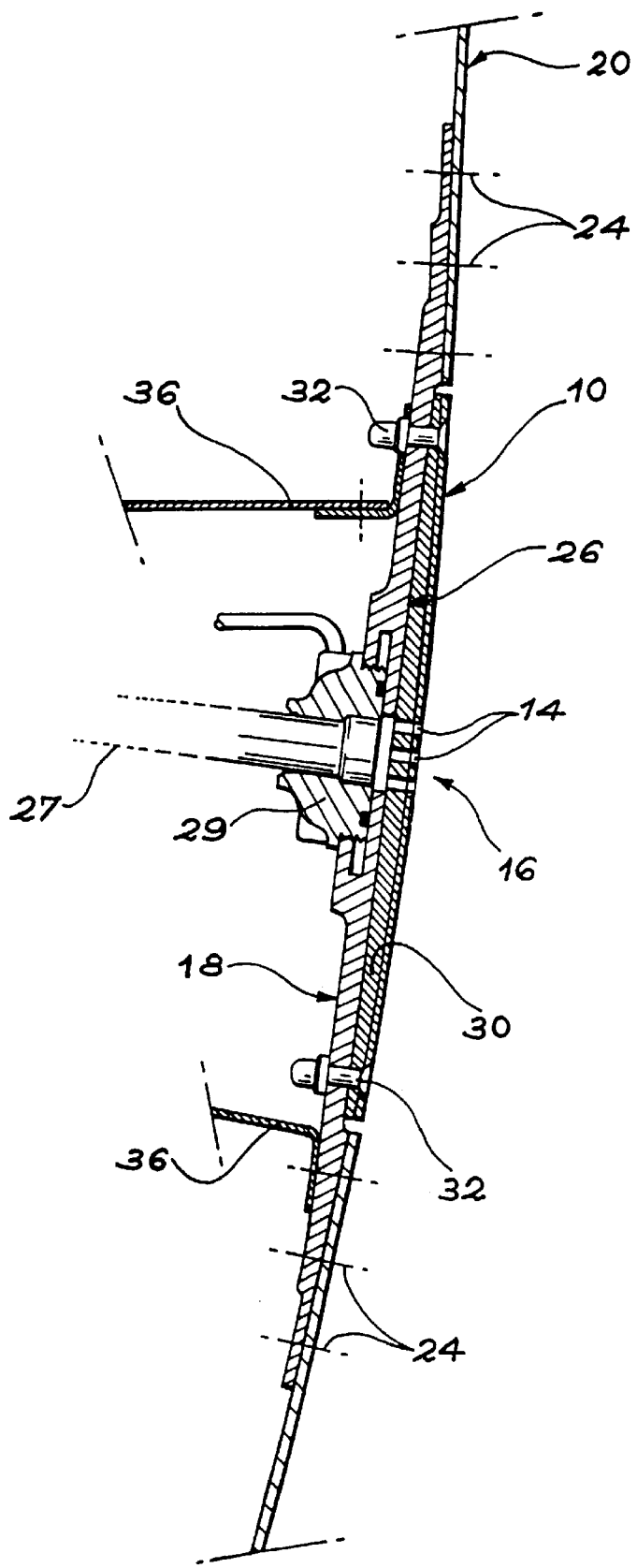
FIG. 5 is a cut-away view taken along line V—V of FIG. 4.

In the mode of embodiment shown in FIGS. 3 to 5, the plate 10 and the opening 22 are rectangular in shape. However, it is to be understood that differently shaped contours (circular, oval, trapezoidal, etc.) can be used without going outside the framework of the invention.

As shown in FIGS. 3 to 5, the structure of the aircraft on which the support element 18 and the fuselage panel 20 are fixed is usually made, in the conventional manner, in the form of a framework comprising circular frames 34 set in transversal planes of the aircraft and longitudinal angle bars 36 extending in the longitudinal direction of the aeroplane. The pressure tapping device S is integrated into one of the meshes defined between two adjacent frames 34 and between two consecutive angle bars 36. As shown in the figures, the support element 18 is fixed between these frames 34 and angle bars 36 by certain fixation elements 24, which moreover serve to fix the fuselage panel 20 to the different elements of the framework.

It is well understood that the invention is not limited to the method of embodiment described above as an example, but covers all variants. In particular, it is to be understood that the nature of the fixation elements 24 and 32, their number and their placement can be different from those illustrated in FIG. 4, without going beyond the framework of the invention. Moreover, the functional play which inevitably exists between the peripheral edge of the plate 10 and the contour of the opening 22 can be bridged by a filler mastic or an equivalent product. In addition and as already observed, the support element 18 can be constituted from a single piece, as shown in the figures, or from several pieces able to take up the integral stresses resulting from the presence of an opening 22 in the panel 20. Also, the fuselage panel 20 can be fixed on the support element 18 either by being connected to it by appropriate assembly means, or by being made out of a single block with said support element, for example in the case of a panel in composite material or a metallic panel with integral machining. Finally, it is to be understood that the invention applies to the production of any pressure tapping device for aircraft, wherever it is located in the fuselage.

What is claimed is:

1. Pressure tapping device for an aircraft, comprising at least one support element, a pressure tapping part carried by the support element and turned towards the outside of the aircraft, and a fuselage panel fixed on the support element and provided with an opening which receives the pressure tapping part, said device comprising a plate in which is integrated, without discontinuity, the pressure tapping part, said plate being fixed on the support element and the opening having a shape and dimensions almost identical to those of the plate, in such a way that the latter is received in said opening and is flush with the external surface of the fuselage panel;

in which the plate is fixed on the support element by fixation elements all arranged around the periphery of said plate; and in which the fixation elements are arranged outside an angular zone of air flow centered on said pressure tapping part.

2. Device according to claim 1, in which shims are interposed between said plate and the support element.

3. Device according to claim 1, in which the support element comprises a recess relative to said opening, in which said plate is countersunk.

4. Device according to claim 3, in which the recess comprises a plane base, against which a plane face of said plate is applied.

5. Device according to claim 1, in which the pressure tapping part is constituted with a central region of said plate, pierced by perforations.

6. Device according to claim 1, in which the angular zone for air flow without fixation elements forms an angle of at least about 30°.

7. Procedure for installing a pressure tapping device on a fuselage panel of an aircraft, according to which the fuselage panel is fixed on a support element, in such a way that a pressure tapping part is received in an opening formed in said panel, the procedure being such that, without discontinuity, the pressure tapping part is integrated with a plate of shape and dimensions almost identical to those of said opening and that said plate is fixed on the support element after having fixed the fuselage panel on the support element, in such a way that the plate is received in said opening and is flush with the external surface of the fuselage;

in which said plate is fixed in the support element by fixation elements all arranged around the periphery of the plate, and in which the fixation elements are placed outside an angular zone of air flow centered on the pressure tapping part.

8. Procedure according to claim 7, in which said plate is fixed on the support element by interposing shims in order to align the external surface of the plate along that of the fuselage.

9. Procedure according to claim 7, in which the fixation elements are placed outside an angular zone of air flow forming an angle of at least about 30°.

* * * * *